United States Patent Office

2,706,161
FLUX FOR ALUMINUM COATING OF FERROUS MATERIALS AND PROCESS OF COATING THEREWITH

Thor H. Westby, Chicago, Ill.

No Drawing. Application December 29, 1950, Serial No. 203,565

2 Claims. (Cl. 117—52)

My invention relates to the coating or plating of base metal material, ferrous or non-ferrous, in the form of sheets, plates, wire, etc., with aluminum and has to do, more particularly, with an improved flux for use in connection with such a process.

I am well aware of and have investigated numerous patents for aluminum coating of metal. I find that such patented disclosures are largely inoperative on a practical, industrial scale or are economically prohibitive.

After extensive study, I have found that the success of aluminum coating operations depends to a large extent upon the character of the flux employed, and I have found further that for an aluminum coating process to be economically feasible, such flux must not only be capable of producing a satisfactory bond between the two metals but must also be low in cost.

The flux which forms the subject matter of my invention meets all of these requirements, being much lower in cost than any flux with which I have heretofore been familiar, while producing an extremely firm bond between the aluminum and the base material and also produces a coated article of satisfactory appearance.

According to my experience prior to the development of the present invention, the most satisfactory flux for aluminum coating had to be employed at an elevated temperature. Thus, aside from the higher cost of the flux itself, there was involved considerable additional expense for fuel required to maintain the flux at the required temperature. An important advantage of my improved flux is that it may be used cold, i. e., at normal atmospheric temperatures.

A further advantage of my improved flux is that the ingredients thereof may be of technical or commercial grade, thus further reducing the cost.

More specifically, I have found that entirely satisfactory aluminum coating may be obtained by the use of common base metal chlorides of commercial grade. Such salts are extremely low in cost. I have found that zinc chloride gives especially satisfactory results and, especially when used in combination with certain other chlorides. The other chlorides which I have found to give excellent results in combination with zinc chloride are lead chloride, cadmium chloride and stannous chloride. The salts of cadmium or tin are, of course, somewhat more expensive than lead and for this reason the combination of zinc and lead chlorides is preferred.

The following example will illustrate a preferred embodiment of my invention, and it should be clearly understood that it is illustrative only and not to be considered as limiting:

Example 1 lb. zinc chloride
½ oz. lead chloride
15 cc. hydrochloric acid
1 gal. water All of the constituents, as noted above, may be of commercial grade. In lieu of the lead chloride, cadmium or stannous chloride may be substituted in proportionate amount according to their respective molecular weights.

My preferred method of mixing and compounding the material is as follows:

About 30 lbs. of zinc chloride is placed in a container suitable for mixing and to it is added a quantity of the desired other chloride in accordance with the proportions indicated above, then add with stirring about 3 gallons of water. The hydrochloric acid may be added at this time, dissolved in the water. After the material has reached a homogeneous condition, I then add about 27 gallons of water and continue stirring until most of the solids are dissolved. The acid is desirable in order to have a certain amount of free chloride ions.

The method of use of the flux involves no departure from known practice. This is to say, the base metal which is to be coated or plated is first cleaned in the usual way, passed through an annealing furnace and then subjected to a pickling bath, preferably of commercial hydrochloric acid at about 150° F. The pickled metal is then passed through a bath of my improved flux at room temperature or above. (Heating of the same by means of the material drawn therethrough is immaterial.) The base metal is then passed directly from the flux bath through a bath of molten aluminum.

It is found, with the use of my improved flux, that an entirely satisfactory coating of aluminum is obtained of adequate thickness to protect the base metal for extremely long periods under the most adverse conditions of weather, temperature changes, etc. At the same time, the aluminum coating has a smooth and attractive appearance.

Aside from the cost advantages noted above, incident to the low cost of the flux ingredients and the saving of fuel resulting from the obviating of heating of the flux, various other important advantages result from the use of my flux. One major advantage lies in the lack of dross in the aluminum bath which is incidental to the use of other fluxes with which I am familiar. This represents a substantial saving of aluminum.

Another major advantage resulting from use of an unheated flux, in accordance with my invention, lies in the elimination of toxic fumes which accompany the use of other flux materials which must be applied at elevated temperatures. Such avoidance of fumes results in more healthful plant conditions and obviates the necessity for the wearing of masks by operating personnel, and hence produces increased efficiency.

With my improved aqueous flux, furthermore, practically no sludge accumulates in the aluminum kettle, such as occurs with fluxes of molten salts and constitutes a serious problem. I also find a smoother flow of aluminum which is more easily wiped, forming a smooth, even coating.

Aluminum coated wire produced in accordance with my invention may be bent on an extremely small radius without cracking or flaking of the coating, and may also be welded without marring.

Various changes coming within the spirit of my invention may suggest themselves to those skilled in the art. Hence, I do not wish to be limited to the specific embodiments described or uses mentioned, but intend the same to be merely exemplary, the scope of my invention being limited only by the appended claims.

I claim:

1. An aqueous flux for promoting the aluminum coating of a base metal by passage of the latter through an aluminum bath present in a treatment-kettle, said flux consisting essentially of an aqueous solution of zinc chloride in the amount of about one pound per gallon of solution; lead chloride in the amount of about one-half of an ounce per gallon of solution; and about 15 cc. of hydrochloric acid per gallon of solution; whereby when the base metal is passed through said aluminum bath the production of dross on the aluminum bath is reduced to a minimum and substantially no sludge accumulates in the kettle.

2. The method of providing a base metal with a coating of aluminum passing the base metal through a flux consisting essentially of an aqueous solution of zinc chloride in the amount of about one pound per gallon of solution; lead chloride in the amount of about one-half of an ounce per gallon of solution; and about 15 cc. of hydrochloric acid per gallon of solution; and then passing the so-treated base metal through an aluminum bath present in a treatment-kettle, said fluxing solution reducing to a minimum the production of dross on the aluminum bath and also preventing accumulation of sludge on the bottom of the kettle.

References Cited in the file of this patent

UNITED STATES PATENTS

| | | |
|---|---|---|
| 92,998 | Peake | July 27, 1869 |
| 503,070 | Broadwell | Aug. 8, 1893 |
| 527,478 | Broadwell | Oct. 16, 1894 |
| 1,399,810 | Shoemaker | Dec. 13, 1921 |

FOREIGN PATENTS

| | | |
|---|---|---|
| 642,869 | Great Britain | Sept. 13, 1950 |

OTHER REFERENCES

Ingalls: "Metallurgy of Zinc and Cadmium," pages 574 and 575, published 1903 by The Engineering and Mining Journal, New York, New York.

"Soft Soldering," by M. E. Fine and R. L. Dowdell, 1945. Preprint of a paper prepared for the 1945 annual Convention of the American Society for Metals (29 pages), page 27 pertinent.